(12) United States Patent
Koseoglu

(10) Patent No.: US 11,253,816 B2
(45) Date of Patent: Feb. 22, 2022

(54) DIRECT OXIDATION OF HYDROGEN SULFIDE IN A HYDROPROCESSING RECYCLE GAS STREAM WITH HYDROGEN PURIFICATION

(71) Applicant: Saudi Arabian Oil Company, Dhahran (SA)

(72) Inventor: Omer Refa Koseoglu, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 16/408,535

(22) Filed: May 10, 2019

(65) Prior Publication Data
US 2020/0353409 A1 Nov. 12, 2020

(51) Int. Cl.
*B01D 53/86* (2006.01)
*B01D 19/00* (2006.01)
(Continued)

(52) U.S. Cl.
CPC ..... *B01D 53/8612* (2013.01); *B01D 19/0036* (2013.01); *B01D 53/002* (2013.01); (Continued)

(58) Field of Classification Search
CPC ........ C10G 67/06; C10G 67/12; C10G 67/14; C10G 27/04; C10G 27/06; C10G 27/08; (Continued)

(56) References Cited

U.S. PATENT DOCUMENTS 3,428,429 A 2/1969 Carson
4,479,928 A 10/1984 Voirin
(Continued)

OTHER PUBLICATIONS

PCT International Search Report and Written Opinion from corresponding PCT Application No. PCT/US2020/034708 dated Aug. 7, 2020.

*Primary Examiner* — Prem G Singh
*Assistant Examiner* — Brandi M Doyle
(74) *Attorney, Agent, or Firm* — Leason Ellis LLP

(57) ABSTRACT

A process and system for treating a hydroprocessing unit effluent gas stream for recycling includes introducing the effluent gas stream into a hydrogen purification zone and recovering a hydrogen-rich gas stream and a liquid stream containing a mixture that includes C1 to C4 hydrocarbons and $H_2S$ which is then mixed with an oxidant and fed to an oxidation unit containing catalyst for conversion of the $H_2S$ to elemental sulfur vapors that is separated for recovery of the elemental sulfur, and recovering a sweetened mixture that includes C1 to C4 hydrocarbons. Alternatively, the hydroprocessing unit effluent gas stream containing $H_2S$ is cooled, contacted with a solvent to absorb the C1 to C4 hydrocarbons and $H_2S$, with the hydrogen-rich stream being recovered for recycling to the hydroprocessing unit, and the rich liquid solvent being flashed to produce a lean solvent stream for recycling to the adsorption zone and a mixed gas stream that includes the C1 to C4 hydrocarbons and $H_2S$ that is passed to an oxidation zone and is reacted with an oxidant in the presence of a catalyst to complete the process as described above for the recovery of elemental sulfur and a mixture that includes the sweetened C1 to C4 hydrocarbons.

14 Claims, 4 Drawing Sheets

(51) Int. Cl.
*B01D 53/00* (2006.01)
*B01D 53/14* (2006.01)
*B01D 53/75* (2006.01)
*C01B 3/56* (2006.01)
*C10G 67/12* (2006.01)

(52) U.S. Cl.
CPC ..... *B01D 53/1418* (2013.01); *B01D 53/1425* (2013.01); *B01D 53/1468* (2013.01); *B01D 53/1487* (2013.01); *B01D 53/75* (2013.01); *C01B 3/56* (2013.01); *C10G 67/12* (2013.01); *B01D 2255/2047* (2013.01); *B01D 2255/20784* (2013.01); *C01B 2203/042* (2013.01); *C01B 2203/048* (2013.01); *C01B 2203/0485* (2013.01); *C10G 2300/207* (2013.01)

(58) Field of Classification Search
CPC ........ C10G 27/10; C10G 53/14; C01B 3/501; C01B 3/503; C01B 3/505; C01B 3/506; C01B 3/508; C01B 3/52; B01D 53/002; B01D 53/34; B01D 53/48; B01D 53/52; B01D 53/74; B01D 53/75; B01D 53/86; B01D 53/8603; B01D 53/8612; B01D 53/118; B01D 53/1425; B01D 53/1456; B01D 53/1468; B01D 53/1487; B01D 53/22; B01D 53/1418
See application file for complete search history.

(56) References Cited

U.S. PATENT DOCUMENTS

| | | |
|---|---|---|
| 4,623,533 A | 11/1986 | Broecker et al. |
| 4,886,649 A | 12/1989 | Ismagilov et al. |
| 5,512,260 A | 4/1996 | Kiliany et al. |
| 5,603,913 A | 2/1997 | Alkhazov et al. |
| 5,891,415 A | 4/1999 | Alkhazov et al. |
| 6,099,819 A | 8/2000 | Srinivas et al. |
| 6,740,226 B2 | 5/2004 | Mehra et al. |
| 6,803,471 B2 | 10/2004 | Carreira et al. |
| 7,060,233 B1 | 6/2006 | Srinivas et al. |
| 8,968,552 B2 | 3/2015 | Ramaseshan et al. |
| 2003/0057136 A1 | 3/2003 | McIntush et al. |
| 2003/0132138 A1 | 7/2003 | Mehra et al. |
| 2003/0194366 A1* | 10/2003 | Srinivas ............. B01D 53/8612 423/230 |
| 2005/0201924 A1 | 9/2005 | Ramani et al. |
| 2013/0112596 A1* | 5/2013 | Ramaseshan .......... C10G 65/08 208/89 |

* cited by examiner

DIRECT OXIDATION OF HYDROGEN SULFIDE IN A HYDROPROCESSING RECYCLE GAS STREAM WITH HYDROGEN PURIFICATION

FIELD OF THE INVENTION

This invention relates to the treatment of hydrocarbon hydroprocessing unit recycle gas streams to recover hydrogen for recycle to the hydroprocessing reactor and to remove hydrogen sulfide from the effluent gases to produce a sweetened hydrocarbon fuel gas.

BACKGROUND OF THE INVENTION

Hydrotreating and hydrocracking processes typically generate large volumes of mixed gas streams containing hydrogen sulfide gas derived from the sour hydrocarbon feeds that must be treated by refinery operators. In one analysis it was found that three diesel hydrotreaters and two hydrocracking units operating in major refineries were generating about 600 MT of sulfur per day. The hydrogen sulfide is commonly removed in amine absorption columns in order to improve the purity of the recycle gas stream to the hydrotreating and hydrocracking units.

The direct oxidation of hydrogen sulfide is known in the art and there are several commercial installations in refineries around the world that are practicing a direct oxidation process for converting $H_2S$ to elemental sulfur. For example, Boreskov Institute of Catalysis, U.S. Pat. No. 4,886,649, "A Method for the Purification of Hydrogen Sulfide-Containing Gases" discloses a catalyzed two-stage deep purification oxidation process where oxygen and the $H_2S$-containing gas are supplied to a fluidized bed of granular catalyst, with consecutive removal of gaseous elemental sulfur. The patent literature includes disclosures relating to catalysts said to be useful for the direct oxidation processes.

A catalyst containing titanium oxide and other metal oxides is disclosed in U.S. Pat. No. 6,099,819, "Catalysts for the Selective Oxidation of Hydrogen Sulfide to Sulfur" for oxidizing hydrogen sulfide to elemental sulfur as having utility in treating sour gas streams in a variety of reactors, e.g., single or multiple stage reactors, fixed bed and fluidized bed reactors, among others.

A catalyst is disclosed in U.S. Pat. No. 7,060,233, "Process for the Simultaneous Removal of Sulfur and Mercury" for treating a gas stream containing hydrogen sulfide, other sulfur-containing compounds and mercury by selective oxidation of the hydrogen sulfide to generate elemental sulfur which is condensed for removal from the gas stream, and any mercury present is converted to mercuric sulfide which is also removed in the sulfur condenser.

The disclosures of each of these patents are incorporated herein by reference to the extent permitted in the jurisdiction in which this application is examined.

In hydroprocessing unit operations, the reactor effluents are separated in hot and/or cold separators and the recycle gas that is rich in unreacted hydrogen is recycled to the hydroprocessing unit. The typical hydrogen-rich recycle gas stream can have a purity in the range of from 70-80 V %, and contain other light hydrocarbon gases including methane, ethane, propane and the butanes, and may contain some heavier hydrocarbons with carbon numbers of C5, or greater. Ammonia can initially be present in the effluent gas stream, but it quickly reacts with the hydrogen sulfide to form ammonium bisulfide. To avoid ammonium salt deposits and the risk of corrosion, washing water is injected into the effluent stream, usually at the inlet of the high pressure (HP) air coolers to solubilize the ammonium salt. The relatively low hydrogen purity reduces the overall hydrogen partial pressure in the hydroprocessing reactor, which in turn adversely impacts the efficiency of the process, i.e., it reduces product quality and product yields, and results in catalyst deactivation and shortens the catalyst life cycle.

The importance of increasing the purity of the hydrogen in the recycle stream of hydroprocessors, such as hydrocracking and hydrotreating units has been well known and new cost-effective and simpler methods are available and others have been proposed to purify the hydrogen for the recycle stream.

In the conventional hydroprocessing of heavy hydrocarbons, the feedstock is mixed with hydrogen gas to form a feed stream that is introduced under pressure into the top of a catalytic reactor. The liquid feedstock and gaseous hydrogen mixture passes downwardly through one or more catalyst beds. The higher the partial pressure of hydrogen in the feedstream to the reactor, the greater will be the efficiency with which the heavier hydrocarbon feedstock is converted into the desired lighter middle distillate products, including jet fuel and diesel fuel. After passing through the catalyst, the hot reactor effluent is cooled and passed to a high pressure separator from which the liquid product stream is removed and passed downstream for further fractionation.

Regardless of the specific process employed, the recycled hydrogen stream is generally obtained by cooling the total reaction product effluent to a temperature in the range of from 15° C. to 60° C. and introducing the cooled effluent into a high pressure (HP) vapor-liquid separation zone. The recovered vapor phase is recycled to the reaction zone to at least in part satisfy the hydrogen requirement of the reaction, along with make-up hydrogen from a separate source that is also combined with the hydrocarbon feedstock upstream of the reaction zone.

The flash gases from the HP separator contain hydrogen, C1 to C4 hydrocarbons and other lighter constituents that are carried over. These flash gases can contain from about 70 volume percent (V %) and up to 80 V % of hydrogen. In the conventional processes of the prior art, the flash gases are combined with a make-up hydrogen stream that is typically available at 96 to 99.9 V % purity. The recycle gas and, if present, the make-up hydrogen streams are compressed and combined with the liquid feedstock at the inlet of the hydroprocessing reactor. A portion of up to 2 V % of the flash gases from the high pressure separator are purged to the refinery fuel gas system to prevent the build-up of the light hydrocarbon products in the reactor's recycle gas recirculation loop.

If the feedstock contains sulfur, i.e., it is sour, the separated effluent gas stream will also contain hydrogen sulfide in addition to the hydrogen, C1 to C4 hydrocarbons and other light carried over constituents. In order to prevent build-up of hydrogen sulfide in the reactor recycle gas recirculation loop in the processes of the prior art, the flash gases are contacted with an amine solution to remove the hydrogen sulfide and to thereby sweeten the gas stream. A portion of the sweetened low pressure flash gases are purged to the refinery fuel gas system as described above to prevent the build-up of the lighter hydrocarbons in the reactor gas recirculation loop. The remaining sweetened recirculated gases are combined with make-up hydrogen, compressed and passed to the reactor inlet as part of the hydroprocessor feed. Depending upon the hydrogen sulfide content of the effluent gas stream exiting the reactor, the hydrogen concentration of the sweetened recirculation gas stream will be increased, for example, from 80 V % hydrogen to 84 V % of hydrogen, e.g., an almost 5% increase as a result of the removal of the hydrogen sulfide.

The type of feedstock to be processed, the product quality requirements, and the amount of conversion for a specific catalyst's life cycle are factors that determine the hydrogen partial pressure required for the operation of hydroprocessors, i.e., of both hydrocracking and hydrotreating units. The hydroprocessing unit's operating pressure and the recycle gas purity determine the hydrogen partial pressure entering the hydroprocessing unit with the hydrocarbon feed. There is limited control over the composition of the flashed gases from the downstream HP separator, and the hydrogen content in V % of the recycle flash gas therefore limits the hydrogen partial pressure ultimately delivered to the hydroprocessing reactor. A relatively lower hydrogen partial pressure in the recycle gas stream effectively lowers the partial pressure of the total hydrogen gas input component to the reactor and thereby adversely affects the operating performance with respect to distillate quantity and quality, catalyst life cycle, the capability for processing heavier feeds, conversion capability and coke formation. To offset the lower performance, the operating pressure of the hydroprocessing reactor has to be increased. Increasing the operating pressure increases the operating cost and can incur a greater initial capital cost for the construction of the reactor and its ancillary operating components, and particularly the pumps. Conversely, by increasing the efficiency of hydrogen gas recovery and the volume percentage of the hydrogen in the recycle gas stream, the hydrogen partial pressure of the recycle gas stream is increased, thereby improving the overall performance of the hydroprocessing reactor as measured by the parameters mentioned above.

In the practice of the prior art hydrocracking or hydrotreating processes, there are only four ways known to improve the hydrogen partial pressure. They are as follows: (1) increasing the hydrogen purity of the make-up stream from the refinery hydrogen unit; (2) purging or venting gas from the high-pressure separator; (3) reducing the temperature of the high-pressure separator to decrease the entrainment of light hydrocarbons in the recycle gas stream; and (4) improving the purity or volume percentage of the hydrogen in the recycle gas stream.

All of these prior art methods have a very limited capability of improving the performance of existing hydroprocessing units. If the hydrogen plant optimizes the purity of the make-up hydrogen, it will be in the 96 to 99 mol % range. Since the high purity hydrogen make-up flow rate is typically only about one-third or less of the total combined hydrogen fed to the hydroprocessing reactor with the recirculation of the flashed recycle gas stream, the overall improvement in the hydrogen purity or concentration of the combined recycle and make-up gas streams is limited.

Purging or venting gases from the HP separator will result in the loss of some of the hydrogen in the circuit which must eventually be replaced, thereby putting a greater demand on the refinery's hydrogen production unit(s). The extent to which the separator temperature can be lowered is limited by the nature of the process and a decrease in temperature has, in any event, a relatively minor effect on the purity or mole percent of the hydrogen in the recycle gas.

Although a variety of processes have been proposed and some adopted that are intended to improve the hydrogen utilization efficiency by increasing the purity of the hydrogen in the recycle gas stream, these processes typically result in significant additional equipment costs and/or require significant changes in operating conditions, such as temperature and pressure. Making such changes to the overall process cycle results in an increase in capital and operating expenses.

In hydroprocessing operations, there are some steps that can be taken to improve the purity of the recycle gas. For example, water can be injected at the inlet of the hot separator vapor air-coolers after the injection point of the washing water to solubilize ammonium bisulfide. However, the effect of washing is limited and some contaminants will remain in the recycle gas. Other methods are known and used to purify the recycle gas, and each has advantages and disadvantages. These methods are: absorption, membrane separation, pressure swing absorption (PSA), cryogenic methods, and their combinations.

A pressure swing adsorption (PSA) process to improve the hydrogen purity of the recycle stream is described in U.S. Pat. No. 4,457,384. However, in the practice of this PSA process, the pressure of the reactor effluent gas stream must be reduced from, e. g., 172 kg/cm$^2$ g to 25 kg/cm$^2$ g. Although the purity of the recycle hydrogen can be increased to 99 mol %, the purified recycle gas must then be passed to a compressor to again increase its pressure to 176 kg/cm$^2$ g so that it can be added to the hydroprocessor feed stream. The net result of this approach is that the overall capital, operating and maintenance costs of the hydroprocessing unit are substantially increased by the addition of the large capacity compressor that is required to practice the PSA process.

A process is described in U.S. Pat. No. 4,362,613 using membranes with pressure drops of up to 150 atmospheres. The installation and use of such systems will also incur substantial capital investment and operating costs that must also be allocated to the hydroprocessing unit.

In order to remove hydrogen sulfide from the recycle gas stream, the sour gas is sent to an amine it for sweetening. As will be known to those skilled in the art, the metals comprising the catalyst are normally in their oxide form which is not active and must be sulfided with $H_2S$ to convert these metals to their active form. Thus, some hydrogen sulfide is needed in the hydroprocessing unit to keep the catalyst in sulfided form. The following disadvantages are associated with hydrogen sulfide present: (1) hydrogen sulfide in hydrotreater recycle gas is an activity depressant for hydroprocessing reactions; (2) hydrogen sulfide inhibits the rate of reaction of hydrocarbon molecules with active sites on the catalyst surface; and (3) hydrogen sulfide reduces the hydrogen partial pressure in the reactor. It is therefore desirable to remove excess hydrogen sulfide from the recycle gas.

FIG. 1 is a simplified schematic illustration of a hydrocracking unit operation of the prior art that includes an amine stripping unit to remove $H_2S$ from the recycle stream. The plot of FIG. 2 derived from prior art data graphically illustrates the adverse impact of the increase in volume percent of hydrogen sulfide on catalytic activity for a generic hydrotreating catalyst in terms of the increase in reactor temperature required to maintain an equivalent throughput to the reactor. As shown in FIG. 2, the relationship is substantially linear between an increase in the volume percent of $H_2S$ present in the recycle hydrogen feed to the hydrotreater and the increase in the reactor temperature required to achieve an equivalent product throughout. Thus, minimizing the $H_2S$ present in the recycle hydrogen stream leads to a more efficient unit operation.

A process for increasing hydrogen partial pressure in a hydroprocessing unit operation is described in U.S. Pat. No. 6,740,226 which includes treating a heavy hydrocarbon feed that contains sulfur to produce a by-product stream containing H$_2$S, and methane and heavier hydrocarbon gases. In order to remove the H$_2$S from the other gases, the entire gas stream is contacted with a lean amine solution in a treatment zone to remove the H$_2$S by forming a liquid reaction product. The remaining treated stream consisting of sweetened methane and heavier hydrocarbon gases is recovered in a separator after which they can be used directly as a refinery fuel or further processed.

A problem addressed by the process and system of the present disclosure is to provide an alternative process for the removal of hydrogen sulfide from the recycle gas stream to hydroprocessing units that is integrated with the refinery operations to provide operational efficiencies and cost-savings as compared to the amine stripping process of the prior art.

SUMMARY OF THE INVENTION

The present disclosure provides a process and system for improving hydrogen purification and removing hydrogen sulfide from hydrotreating and hydrocracking unit recycle gas streams by separating and recovering a purified hydrogen recycle stream and treating the remaining sour fuel gases by direct oxidation of the H$_2$S to produce sulfur and the recovery of a sweetened hydrocarbon fuel gas. The direct oxidation of the H$_2$S to elemental sulfur provides an economical alternative for the treatment of the recycle gas stream when compared to the amine absorption units of the prior art which, in order to facilitate a clear understanding of the context of the process and system of the present disclosure, will be described in more detail with reference to FIG. 1.

As schematically illustrated in the simplified process flow diagram of FIG. 1, a prior art hydrocracking reactor (110) containing a suitable catalyst receives a combined feed stock stream (108) formed from (a) a heavy hydrocarbon liquid (106) that is comprised of, e.g., vacuum gas oil (VGO) and demetalized oil (DMO), and (b) a mixed hydrogen gas stream (162) which is comprised of a recycle gas stream (178) and a make-up gas stream (166), the latter typically originating in a hydrogen generation unit (not shown) that is dedicated, at least in part, to this make-up stream. It will be understood that the design capacity of the hydrogen generation unit must be great enough to satisfy the maximum requirements of the reactor (110), taking into account the quantity or purity of the hydrogen provided by the recycle stream (178) with which it is combined to form the mixed hydrogen feed stream (162). It will be understood that any improvement in the purity of the hydrogen in the recycle gas stream will have a positive effect of the overall efficiency of the unit operation through mixed hydrogen input stream (162), combined reactor feed stream (108) and the hydrocracking reactor (110).

The reactor effluent (112) is a two-phase stream containing cracked hydrocarbon vapor and cracked hydrocarbon liquid and unreacted hydrogen which passes to high pressure (HP) gas/liquid separator (120) which operates at a pressure only slightly reduced from that of the reactor (110). In a typical hydrocracking operation, the reactor is maintained at about 2,500 psig (175.8 kg/cm$^2$ g) and the HP separator operates at about 2400 psig (168.7 kg/cm$^2$ g). The liquid stream (122) removed from the HP separator contains the hydrocracked products and is passed to product fractionation (not shown).

The vapor stream (124) withdrawn from the HP separator (120) contains the unreacted hydrogen, as well as a minor proportion of methane, ethane, propane, butanes, hydrogen sulfide, and pentanes, sometimes referred to hereinafter as C$_1$+. The flashed gases in stream (124) from the HP separator can contain, for example, from about 78-82 mol % hydrogen.

In a typical hydrocracking system (not shown), but known to those of ordinary skill in the art, the system employs one of the following:

1. the reactor effluent stream (112) is cooled to ambient temperatures or to temperatures in the range of from about 45° C. to 60° C. prior to vapor-liquid separation in HP separator (120) and the separated ambient temperature gases become the recycle hydrogen gas stream (124) and the ambient temperature liquid product flows as part of stream (122) to product fractionation; or 2. the HP separator (120) is a high-pressure, high-temperature separator, and the separated gases in stream (124) are further cooled to ambient temperature and any condensed liquids produced by the cooling are separated from ambient temperature gases in a high pressure ambient temperature (HPAT) separator (not shown) thereby forming the ambient temperature recycle gas stream (178) and ambient temperature liquids (122) separated in HPAT separator flow to product fractionation; or 3. a combination of process steps 1 and 2 above, comprising partial cooling and partial separation with the objective of separating a high-pressure, ambient temperature recycle hydrogen gas stream (178).

Depending upon the relative pressures of each stream, the make-up and recycle gas streams are commonly combined in either a single or a multi-stage compressor (160) upstream of the reactor (110). The recycle gas stream (164) enters the compressor at about 2,400 psig (168.7 kg/cm$^2$ g) and 100 to 140° F. (37.8 to 60° C.). The combined hydrogen gas (162) exits the compressor at the reactor operating pressure, which in this representative example is about 2,500 psig (175.8 kg/cm$^2$ g).

Where the heavy hydrocarbon liquid feed (106) to the hydrocracking unit includes sulfur-containing compounds, the flash gas stream (124) will contain a minor portion of hydrogen sulfide gas. In order to avoid a build-up of hydrogen sulfide in the system and its deleterious effects on the catalyst, it must be removed, and the entire sour flash gas stream (124) is passed to an amine contact zone containing contactor vessel (170) where the sour flash gas is typically contacted with an amine solution in counter-current flow. The lean amine solution (172) is introduced into the top of the contactor vessel (170) and the rich amine solution (174) containing the sulfur reaction product is withdrawn from the bottom of the zone (170). In the further processing, not shown, the sulfur is removed and the rich amine solution (174) is regenerated to obtain sweet lean amine solution (172) and is returned to zone (170) for use in the sweetening process for the removal of hydrogen sulfide.

The sweetened recycle gas stream (178) leaving zone (170) contains, for example, from about 80 to 84 mol % hydrogen, the relatively purity having been increased by the removal of the hydrogen sulfide. In a typical process of the prior art, a minor portion of the sweet recycle gas is withdrawn as purge gas stream (176). The purge gas can be used as refinery fuel. However, the purge gas does contain hydrogen which is lost to the unit operation, and must be accounted for in the make-up stream (166). The remaining recycle gas stream (180) downstream of the purge gas take-off is passed to a compressor (160).

In contrast to the prior art process described above that employs an amine scrubber to remove the H$_2$S and sweeten the recycle gas stream, the process and system for treating a hydroprocessing recycle gas stream of the present disclosure broadly comprehends an absorption unit to purify the hydrogen gas, and a direct oxidation unit to sweeten the separated sour gas and provide a low sulfur, sweet fuel gas.

Hydrogen is separated from the recycle gas stream and recovered in a purification step and hydrogen sulfide is subsequently converted to elemental sulfur in a direct catalytic oxidation step. Direct oxidation takes place at relatively low temperatures over an oxidation catalyst, so that the hydrocarbons originally present in the recycle gas stream are not effected in the oxidation zone when the $H_2S$ is converted, thereby improving the overall efficiency of the process by providing a sweetened fuel gas for recovery.

Preferred oxidation catalysts can comprise metals from Periodic Table groups 1, 2, and 4 through 12, and the catalyst system can comprise an alumina support. The catalyst can be doped with rare earth metals that enhance their activity. In certain embodiments, the catalyst is magnesium chromate ($MgCr_2O_4$) on an alumina support. In other embodiments, the catalyst can be Cu—Zn on an alumina support. The concentration of metals in the $MgCr_2O_4$ oxidation catalyst can be in the range of from 5 to 25 weight percent (5 W %-25 W %). The concentration of metals in the Cu—Zn oxidation catalyst can be in the range of from 5 W % to 50 W %.

The catalysts can be prepared using any of the well-known methods including impregnation of the metal on the support, co-precipitation of all of the metals or the co-milling of metal salts and the support. In one impregnation method, the metal solutions are prepared and added to the support by spraying or by mixing the metal solution and the support. The water is then evaporated and the catalyst is dried and calcined. In a co-precipitation method, metal salt solutions, including the support metals, are prepared and precipitated at the same time. In a co-milling method, the support and the metal salts are co-milled to prepare the catalyst. Regardless of the method of preparation, the catalysts are oxidized and activated with an oxidant gas such as oxygen, air or oxygen-enriched air. This oxidation takes place above the dew point of elemental sulfur and the sulfur is recovered by reducing the temperature of the reaction mixture to condense the sulfur vapors.

A catalyst that has been found to be particularly suitable for use in the present process is described in U.S. Pat. No. 4,886,649 and has specified characteristics. The catalyst can be a granular catalyst containing from 10.0 to 20.0% by weight of magnesium chromite deposited on aluminum oxide. The carrier for the catalyst can be aluminum oxides of various compositions, e.g., $\gamma$-$Al_2O_3$, $\alpha$-$Al_2O_3$, $\delta$-$Al_2O_3$, and $\theta$-$Al_2O_3$. In certain embodiments, the catalyst is in the form of spherical granules to minimize mechanical wear of the catalyst in order to prolong service life as compared to catalysts in shapes that are less robust and subjected to breaking and deterioration, e.g., rings. In certain embodiments, in order to ensure stable operation of the catalyst over time, a granular catalyst with a strength of at least 165 kg/cm$^2$ is preferred.

BRIEF DESCRIPTION OF THE DRAWINGS

The invention will be described in further detail below and with reference to the attached drawings in which like numerals are used to refer to the same or similar elements, and where.

DETAILED DESCRIPTION OF PREFERRED EMBODIMENTS

The process and system of the present disclosure will be described in additional detail with reference to an embodiments illustrated schematically in FIGS. 3 and 4. It will be noted that in FIGS. 3 and 4, the numbering system applied to the principal elements and streams is common, with the first digit corresponding to the respective figure number. In each figure, the exemplary embodiment is directed to a hydrocracking unit operation. However, it will be understood that the process and system has utility in other hydroprocessing unit operations where a recycle gas stream containing principally hydrogen is mixed with lower hydrocarbons and hydrogen sulfide that must be treated to purify the hydrogen for use in the recycle stream prior to its introduction with the make-up hydrogen stream into the recycle hydrogen compressor.

Figure 1:
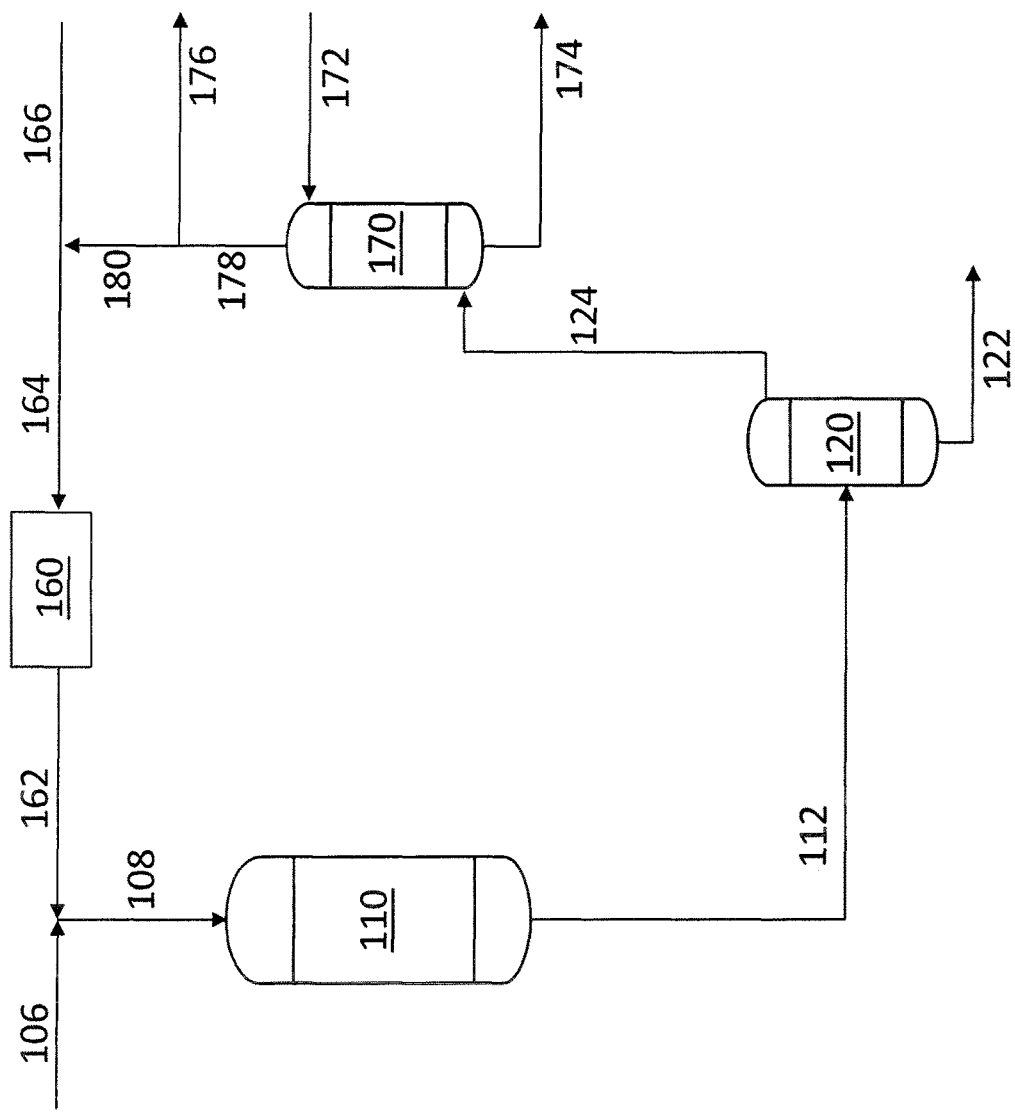
FIG. 1, as noted above, is a simplified schematic illustration of a hydrocracking unit operation of the prior art that includes an amine stripping unit to remove $H_2S$ from the recycle stream.
Figure 2:
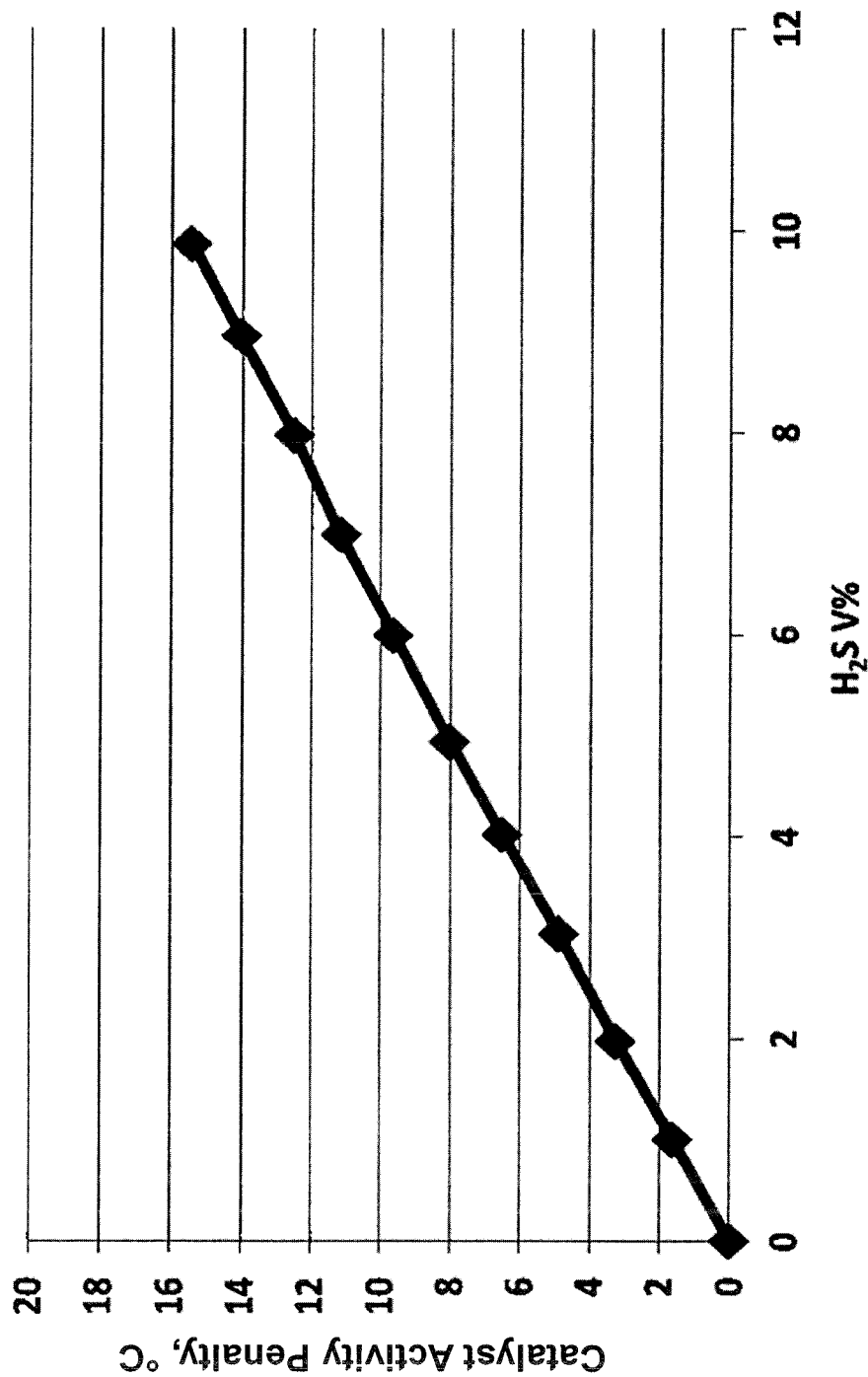
FIG. 2 is a plot depicting the effect of hydrogen sulfide present in the recycle gas expressed as a vol % on the activity of a hydrotreating catalyst as measured by the increase required in the reactor operating temperature.
Figure 3:
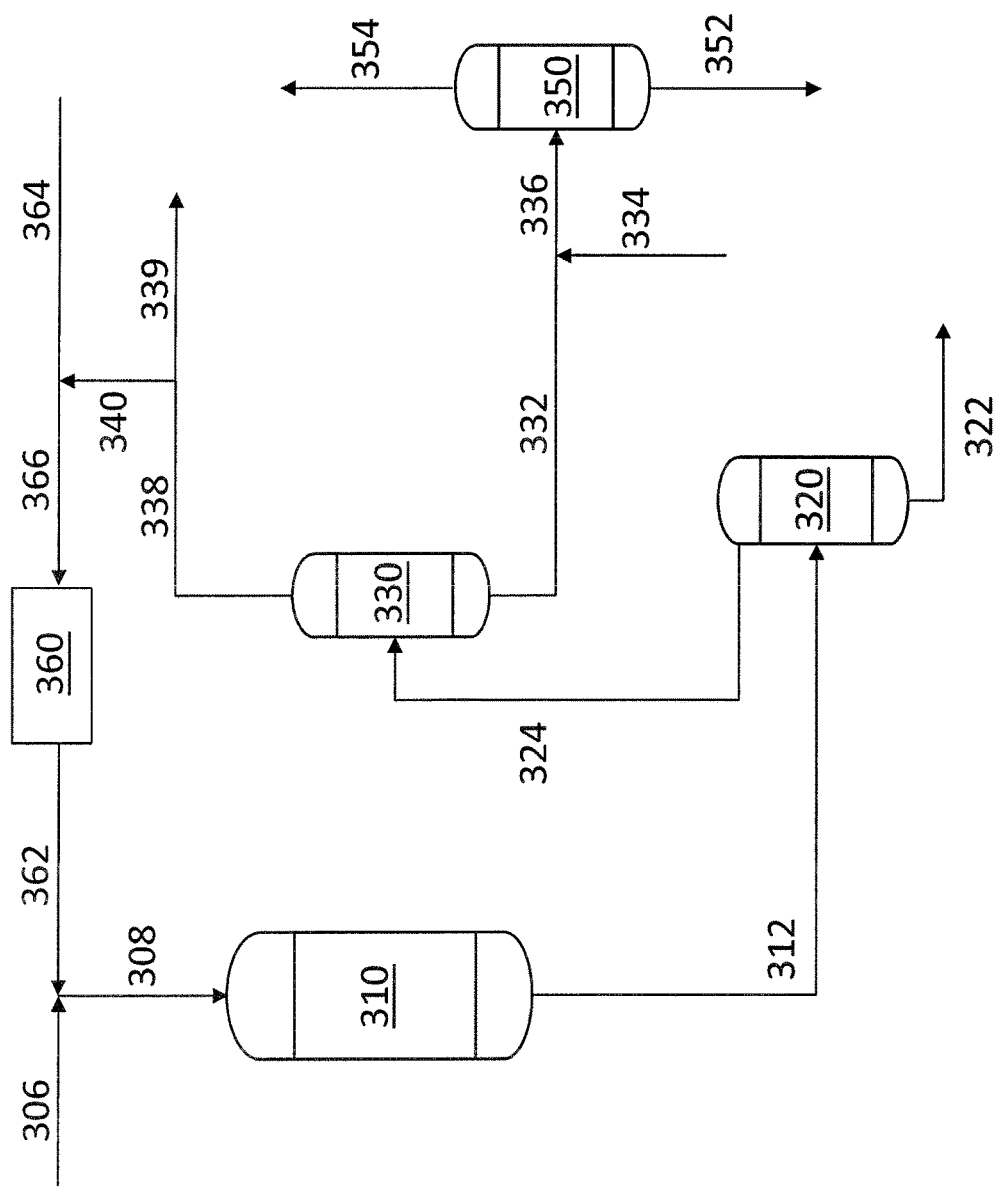
FIG. 3 is a simplified schematic illustration of an improved process in accordance with the present disclosure for a hydrocracking unit with hydrogen purification and sour gas oxidation.
Figure 4:
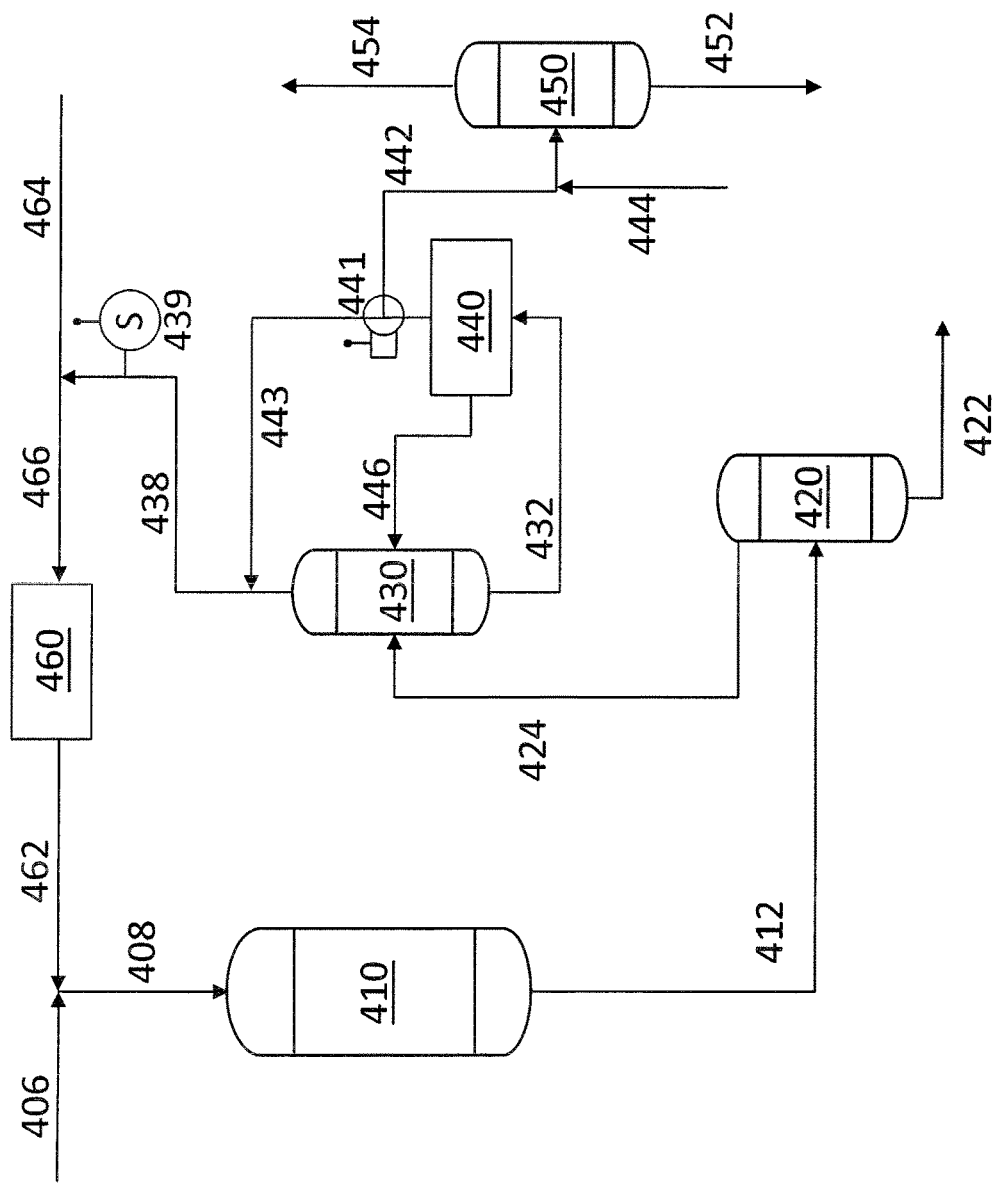
FIG. 4 is a simplified schematic illustration of an embodiment in accordance with the present disclosure for a hydrocracking unit employing hydrogen purification by absorption and sour gas oxidation.

Referring now to FIG. 3, the heavy hydrocarbon liquid feed containing sulfur compounds (306) is mixed with the compressed mixed hydrogen feed (362) and the mixed feed (308) enters the hydrocracking reactor (310) where the feed is catalytically hydrocracked to produce the hydrocracking unit effluent stream (312) which includes liquid hydrocarbons of reduced molecular weight and hydrocarbon gases including hydrogen, C1 to C4, and hydrogen sulfide. Depending upon the geographical source of the unprocessed heavy hydrocarbon feed, the sulfur can range from a low of about 0.1 W % for sweet crude oil and up to 6 W % for extremely sour crude oils.

A hydrocracked product stream (322) is recovered from the HP gas/liquid separator and sent to a fractionating zone (not shown) for recovery of end products. The gaseous effluent stream (324) from the HP separator (320) is passed to the absorption zone (330) for removal of the C1 to C4 compounds and the $H_2S$ which are discharged as an effluent stream (332). The purified hydrogen recycle gas stream (338) is recovered from absorption zone (330) and is mixed with the hydrogen make-up stream (364). The mixed hydrogen stream (366) is passed to the recycle gas compressor (360) from which the compressed mixed hydrogen stream (362) is introduced as mixed feed (308) into the reactor (310) with the heavy liquid hydrocarbon feed (306).

With continued reference to FIG. 3, the hydrocarbon effluent stream (332) from the absorption zone (330) is mixed with an oxidant (334) and passed as a mixed reactant stream (336) into the catalyzed oxidation unit (350) where the hydrogen sulfide is converted to elemental sulfur stream (352) in vapor form that is separated from the remaining hydrocarbons that then pass as the sweetened hydrocarbon fuel stream (354).

The oxidation zone (350) can be operated as a fixed bed or a fluidized bed reactor with a GHSV of about 3600/hr. The sulfur-to-oxygen ratio can be in the range of from 10:1, and preferably in the range of 4:1, with the preferred range of 2:1. The reactor can be operated at a temperature of up to 380° C., and preferably from 140° C. to 350° C., or 140° C. to 160° C., or 250° C. to 350° C., and at pressures ranging from 1-10 bars, or 1-5 bars, and preferably from 1-3 bars. The hot sulfur vapors are cooled for separation and removed from the oxidation zone (350) as elemental sulfur (352) in accordance with the prior art Claus process.

As noted above, the oxidation of the $H_2S$ takes place well above the dew point of the elemental sulfur produced and the downstream treatment includes the steps of the separation of the sulfur from the sweetened fuel gas and the condensation of the gaseous elemental sulfur into a molten or solid form in accordance with methods and employing apparatus that is known in the art.

Example 1

An effluent gas stream from a hydrocracking unit HP hot liquid/gas separator containing 67 V % of hydrogen is passed to an absorption column to remove methane, heavier hydrocarbons, and hydrogen sulfide. The sour bottoms containing methane and heavier hydrocarbons, and hydrogen sulfide are sent to an oxidation zone to remove the hydrogen sulfide and produce elemental sulfur. The process increases hydrogen purity from 67 V % to 89 V %. The operating conditions for Example 1 are provided in Table 1 below.

TABLE 1

| Variable\Vessel | Units | | 430 | 440 | 450 |
|---|---|---|---|---|---|
| Temperature | ° C. | min/max | −1/−18 | 0/14 | 100/350 |
| Pressure | Bar | min/max | 50/200 | 50/200 | 1/10 |
| LHSV | h$^{-1}$ | | 1 | 0.5 | |
| Residence Time | Seconds | | | | 0.8 |
| Solvent/Oil Ratio | Lt/Kg-mol | | 41.6 | | |
| $O_2$/S ratio | Mol/Mol | | | | 1.5 |
| GHSV | h$^{-1}$ | min/max | 1000/5000 | 1000/5000 | 1000/5000 |

Reference is now made to the embodiment of FIG. 4 in which the initial process steps correspond to those described in connection with FIG. 3. The liquid heavy hydrocarbon feed containing sulfur compounds (406) is mixed with the compressed mixed hydrogen feed (462) and the mixed feed (408) enters the hydrocracking reactor (410) where the feed is catalytically hydrocracked to produce the hydrocracking unit effluent stream (412) which is comprised of liquid hydrocarbons of reduced molecular weight and hydrocarbon gases, including C1 to C4, hydrogen and hydrogen sulfide. The effluent (412) is passed to HP hot gas/liquid separator (420).

A hydrocracked liquid hydrocarbon product stream (422) is recovered from the HP separator (420) and sent to a fractionating column (not shown) for recovery of end products. The gaseous effluent stream (424) from the HP separator (420) is passed to the liquid hydrocarbon absorption zone (430) the operation of which will be described in more detail below for removal of the C1 to C4 compounds and the $H_2S$ which are discharged as absorbent-rich solvent effluent stream (432). Heat exchange and cooling is required of the hot effluent stream (424) which can be at a temperature of from 200° C. to 260° C. Cooling can be by a combination of ambient air and water cooled heat exchangers, in combination with cryogenic coolers. The purified hydrogen recycle gas stream (438) is recovered from absorption zone (430) and is mixed with the hydrogen make-up stream (464). The mixed hydrogen stream (466) is passed to the recycle gas compressor (460) from which the compressed mixed hydrogen stream (462) is introduced as mixed feed (408) into the reactor (410) with the heavy liquid hydrocarbon feed (406).

The rich hydrocarbon solvent (432) is passed to flashing zone (440) to separate the solvent compounds for recovery as recycle stream (446) for return to the solvent absorption zone (430). The C1 to C4 compounds and hydrogen sulfide (442) are recovered and are passed from the flashing zone (440) to the catalyzed gaseous oxidation zone (450). An oxidant, e.g., air (444) is mixed with the compounds (442) recovered from the flashing zone (440) and introduced into the catalyst bed contained in the gaseous oxidation zone (450), where the $H_2S$ is directly oxidized to elemental sulfur in a gaseous form which is then cooled and condensed into at least a liquid form (452) for recovery. With the $H_2S$ converted into elemental sulfur the remaining sweetened hydrocarbons (454) are recovered for use as a refinery fuel and/or for further downstream processing, e.g., steam cracking to obtain additional value added products such as ethylene, propylene and butenes.

The material balance for the absorption and direct oxidation steps is set forth below in Table 2. Continuing reference is made to the flow diagram of FIG. 4 in connection with the following description of Table 2, which represents the material balance data for each of the streams beginning with the sour gas stream (424) that is introduced into the absorption zone (430). Note that the element numbers for each of the seven (7) streams identified in FIG. 4 appears in sequence in the first row of Table 2 and that a short description for each stream appears in the second row of Table 2 below its corresponding element number. The conditions of Temperature, Pressure and Density, where relevant, are provided for the respective streams in the third, fourth and fifth rows. The constituents comprising the streams are entered in the first column on the left side of Table 2 under the heading "Composition". The bottom row entries represent the totals as measured in Kg/H for each of the constituents listed above.

It is noted that each of the values for the C1 to C5 alkanes, and the value for the combined C6 and C7 compounds in the sour gas stream (442) is the same following their recovery in the sweetened fuel stream (454). The value for the elemental sulfur (452) recovered from the oxidation zone (450) is consistent with the original value for hydrogen sulfide in the sour gas stream (442), reduced by the hydrogen sulfide that passed with the sweetened hydrogen recycle stream (438) that is required to maintain the hydroprocessing reactor catalyst in a sulfided state.

TABLE 2

Material balance around absorption and oxidation steps

| | | | Stream number | | | | | |
| --- | --- | --- | --- | --- | --- | --- | --- | --- |
| | | | 424 | 446 | 438 | 442 | 444 | 454 | 452 |
| Stream Name | | MW | Sour Gas | Solvent | Sweet Gas | Sour Reject | Oxidant | Sweet Fuel | Sulfur |
| Temperature | °C. | | −17.7 | −31.4 | 15.8 | 16.2 | 250 | 250 | 250 |
| Pressure | psig | | 700 | 1 | 670 | 5 | 1 | 5 | 1 |
| Density | Kg/L | | | 626 | | | | | |
| | | | | Composition | | | | | |
| Oxygen | Kg/h | 32 | 0.0 | 0.0 | 0.0 | 0.0 | 585.8 | 0.0 | 0.0 |
| H2 | Kg/h | 2 | 1942.3 | 0.0 | 1799.3 | 141.9 | 0.0 | 141.9 | 0.0 |
| HYDROGEN SULFIDE | Kg/h | 34 | 1224.0 | 0.0 | 92.3 | 1131.7 | 0.0 | 0.0 | 1065.1 |
| METHANE | Kg/h | 16 | 5739.6 | 0.0 | 1554.9 | 4009.9 | 0.0 | 4009.9 | 0.0 |
| ETHANE | Kg/h | 28 | 444.5 | 0.0 | 42.8 | 384.0 | 0.0 | 384.0 | 0.0 |
| PROPANE | Kg/h | 44 | 1040.0 | 0.0 | 94.1 | 839.4 | 0.0 | 839.4 | 0.0 |
| I-BUTANE | Kg/h | 58 | 859.5 | 0.0 | 69.4 | 587.8 | 0.0 | 587.8 | 0.0 |
| N-BUTANE | Kg/h | 58 | 426.8 | 0.0 | 32.2 | 259.3 | 0.0 | 259.3 | 0.0 |
| PENTANE | Kg/h | 72 | 348.0 | 827.6 | 232.6 | 1565.2 | 0.0 | 1565.2 | 0.0 |
| C6-C7 | Kg/h | 93 | 8.2 | 0.0 | 7.7 | 16.0 | 0.0 | 16.0 | 0.0 |
| Total | Kg/h | | 12032.9 | 827.6 | 3925.3 | 8935.2 | 585.8 | 7803.5 | 1065.1 |

As previously noted, the active phase metals in oxide form are not catalytically active and must be sulfided to convert them into the active sulfide form. The following are simplified reaction schemes for some active phase metals in their oxide forms that are converted to sulfides.

$$1MoO_3 + H_2 + 2H_2S \rightarrow MoS_2 + 3H_2O \quad (1)$$

$$3NiO + H_2 + 2H_2S \rightarrow Ni_3S_2 + 3H_2O \quad (2)$$

$$9CoO + H_2 + 8H_2S \rightarrow Co_9S_8 + 9H_2O \quad (3)$$

$$1WO_3 + H_2 + 2H_2S \rightarrow WS_2 + 3H_2O \quad (4)$$

For example, if it is predetermined that at least 1000 ppm of H$_2$S is required to maintain the catalyst in the sulfide form, the concentration of H$_2$S in the sweetened hydrogen recycle stream (438) will be controlled accordingly to meet this requirement.

In an embodiment that will be described with reference to FIG. 4, one or more H$_2$S sensors "S" (439) linked to a microprocessor (not shown) continuously or intermittently monitor the concentration of H$_2$S in the recycle stream (438) leaving the hydrocarbon absorption zone (430). If the sensor "S" indicates an H$_2$S concentration below the predetermined desired value, an automated three-way valve (441) controlled by signals from the microprocessor is opened to admit a predetermined flow of the gaseous effluent (442) containing H$_2$S from the flashing zone (440) and pass the supplemental H$_2$S feed (443) for mixing with the sweetened hydrogen recycle stream (438) upstream of the sensor "S" (439) monitoring the H$_2$S concentration and, via a signal to the microprocessor, adjusts the automated three-way flow control valve (441) to maintain the predetermined desired H$_2$S concentration introduced into the mixed hydrogen stream (466).

The practice of the integrated refinery process of the present disclosure for the direct oxidation of hydrogen sulfide in a hydroprocessing recycle gas stream with hydrogen purification provides the following benefits:

1. hydrogen purity is increased by 22 V % which results in an increase in hydrogen partial pressure and improved conversion rates in hydrotreating and hydrocracking processes;

2. the recycle gas compressor efficiency is improved since the methane and other hydrocarbons separated as sour bottoms in the absorption step are not passed to the recycle gas compressor;

3. the hydrogen sulfide is converted to elemental sulfur and the installation and use of an amine column traditionally required for H$_2$S absorption is eliminated; and 4. a sweetened fuel stream that is substantially free of H$_2$S is recovered for use as a fuel in the refinery or for further processing.

The improved process and system have been described above and in the attached drawings from which modifications and variations will be apparent to one of ordinary skill in the art and the scope of the invention is to be determined by the claims.

The invention claimed is:

1. An integrated process for the treatment of a hydrocarbon hydrocracking unit recycle gas stream, the process comprising:
   a. mixing a sulfur-containing heavy hydrocarbon liquid feedstock with hydrogen gas to produce a combined feedstream and introducing the combined feedstream into a hydrocracking unit;
   b. hydrocracking the combined feedstream to produce a hydrocracking unit effluent stream;
   c. passing the effluent stream to a gas/liquid separator and removing a liquid effluent stream and a gaseous effluent stream from the separator;
   d. introducing the gaseous effluent stream into a hydrogen purification unit to produce a hydrogen-rich gas stream and a hydrogen-lean stream consisting essentially of a mixture of C1 to C4 hydrocarbons and H$_2$S;
   e. mixing the hydrogen-lean stream consisting essentially of the mixture of C1 to C4 hydrocarbons and H$_2$S with an oxidant to produce an oxidation unit feedstream;
   f. contacting the oxidation unit feedstream in a catalytic oxidation unit with a catalyst, wherein the catalyst is MgCr$_2$O$_4$ or Cu—Zn on an alumina support, to convert substantially all of the H$_2$S to elemental sulfur and to produce an oxidation unit effluent stream comprising a sweetened mixture of C1 to C4 hydrocarbons and elemental sulfur vapors;

g. condensing the sulfur vapors and recovering the elemental sulfur from the oxidation unit effluent stream; and h. recovering the sweetened mixture of C1 to C4 hydrocarbons from the oxidation unit.

2. The process of claim 1, wherein the hydrogen-rich gas stream of step (d) contains from 90 mol % to 99 mol % of hydrogen.

3. The process of claim 1, wherein the hydrogen purification unit is selected from the group consisting of an absorption unit, a pressure swing absorption unit, a membrane separation unit, a cryogenic unit, and combinations thereof.

4. The process of claim 3, wherein the hydrogen purification unit is an absorption unit.

5. The process of claim 1, wherein the oxidation unit is maintained at a temperature in the range of from 100° C. to 400° C.

6. The process of claims 1 and 5, wherein the oxidation unit is maintained at a pressure in the range of from 1 bar to 20 bar.

7. The process of claim 1, wherein the oxidant is air or oxygen or oxygen-enriched air.

8. An integrated process for the treatment of a hydrocracking unit hydrocarbon recycle gas stream, the process comprising:

a. mixing a sulfur-containing heavy hydrocarbon liquid feedstock with hydrogen gas to produce a combined feedstream and introducing the combined feedstream into a hydrocracking unit;

b. hydrocracking the combined feedstream to produce a hydrocracking unit effluent stream;

c. separating the hydrocracking unit effluent stream in a gas/liquid separator into a hydrocracking unit effluent liquid stream and a hydrocracking unit effluent gas stream;

cooling the hydrocracking unit effluent gas stream and recovering a cooled hydrocracking unit effluent gas stream;

e. introducing the cooled hydrocracking unit effluent gas stream and a liquid solvent stream into an absorption zone to absorb a mixture comprising C1 to C4 hydrocarbons and $H_2S$ and produce a hydrogen-rich gas stream and a rich liquid solvent stream comprising a mixture of C1 to C4 hydrocarbons and $H_2S$;

f. recovering the hydrogen-rich gas stream for use as a recycle hydrogen gas stream;

g. recovering and flashing the rich liquid solvent stream comprising the mixture of C1 to C4 hydrocarbons and $H_2S$ in at least one flashing zone to produce a lean liquid solvent stream and a second stream consisting essentially of a mixture of C1 to C4 hydrocarbons and $H_2S$;

h. mixing the second stream consisting essentially of the mixture of C1 to C4 hydrocarbons and $H_2S$ with an oxidant to produce an oxidation unit feedstream;

i. oxidizing the oxidation unit feedstream in an oxidation unit in the presence of a catalyst, wherein the catalyst is $MgCr_2O_4$ on an alumina support or Cu—Zn on an alumina support, to convert substantially all of the $H_2S$ to elemental sulfur vapors and separating the elemental sulfur vapors from the hydrocarbon mixture consisting essentially of sweetened C1 to C4 hydrocarbons;

j. recovering elemental sulfur vapors from the oxidation unit; and k. recovering the mixture consisting essentially of sweetened C1 to C4 hydrocarbons from the oxidation unit.

9. The process of claim 8, wherein the hydrogen-rich gas stream of step (e) contains from 90 mol % to 99 mol % of hydrogen.

10. The process of claim 8, wherein the oxidation unit is maintained at a temperature in the range of from 100° C. to 400° C.

11. The process of claims 8 and 10, wherein the oxidation unit is maintained at a pressure in the range of from 1 bar to 20 bar.

12. The process of claim 8, wherein the hydrocracking unit effluent gas stream is cooled to a temperature in the range of from −20° C. to 40° C.

13. The process of claim 8, wherein the solvent in step (e) comprises C4 and C5 hydrocarbons.

14. The process of claim 8, further comprising recycling the lean liquid solvent stream from step (g) for use in step (e).

* * * * *